United States Patent
Liptak et al.

(10) Patent No.: US 12,064,300 B2
(45) Date of Patent: Aug. 20, 2024

(54) METHOD AND SYSTEM FOR MAGNETORHEOLOGICAL CONTROL OF PERSONAL CARE DEVICE ORIFICES

(71) Applicant: KONINKLIJKE PHILIPS N.V., Eindhoven (NL)

(72) Inventors: Richard William Liptak, Seattle, WA (US); Anandh Balakrishnan, Tulalip, WA (US)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 370 days.

(21) Appl. No.: 17/637,034

(22) PCT Filed: Aug. 19, 2020

(86) PCT No.: PCT/EP2020/073137
§ 371 (c)(1),
(2) Date: Feb. 21, 2022

(87) PCT Pub. No.: WO2021/032757
PCT Pub. Date: Feb. 25, 2021

(65) Prior Publication Data
US 2022/0354618 A1  Nov. 10, 2022

Related U.S. Application Data (60) Provisional application No. 62/889,092, filed on Aug. 20, 2019.

(51) Int. Cl.
*A61C 17/02* (2006.01)
*A61C 1/00* (2006.01)
*B05B 1/30* (2006.01)

(52) U.S. Cl.
CPC ............ *A61C 1/0015* (2013.01); *A61C 17/02* (2013.01)

(58) Field of Classification Search
CPC ...................................................... A61C 17/02
See application file for complete search history.

(56) References Cited

U.S. PATENT DOCUMENTS 3,874,083 A  4/1975  Buckley
4,204,328 A  5/1980  Kutner
(Continued)

FOREIGN PATENT DOCUMENTS

KR   20190009964 A   1/2019

OTHER PUBLICATIONS

International Search Report and Written Opinion Dated Sep. 29, 2020 for International Application No. PCT/EP2020/073137, Filed Aug. 19, 2020.
(Continued)

*Primary Examiner* — Jeremy Carroll (57) ABSTRACT

A nozzle (14) for use with a personal care device (10), comprising: (i) a nozzle housing (50/52) defining a central channel (54) through which a stream of liquid and/or air is directed, and comprising a housing orifice (56) at the end of the central channel; (ii) a magnetorheological liquid housing (58) located over at least a portion of the nozzle housing at the housing orifice, and comprising a tip with an adjustable diameter orifice (59) through which the stream of liquid and/or air exits, wherein the adjustable orifice is adjustable between at least a first diameter and a second diameter; and (iii) one or more magnets (62) configured to control magnetorheological liquid (60) in the magnetorheological liquid housing to adjust between the at least first diameter and second diameter of the adjustable diameter orifice.

15 Claims, 6 Drawing Sheets

(56) References Cited

U.S. PATENT DOCUMENTS

| | | | | |
|---|---|---|---|---|
| 6,299,031 | B1* | 10/2001 | Cavallaro | B05C 11/10 |
| | | | | 252/62.51 R |
| 7,467,629 | B2* | 12/2008 | Rand | A61M 15/0068 |
| | | | | 128/200.14 |
| 2004/0002665 | A1* | 1/2004 | Parihar | A43B 7/146 |
| | | | | 600/587 |
| 2015/0083759 | A1* | 3/2015 | Medeiros | B65D 47/32 |
| | | | | 222/494 |
| 2017/0086954 | A1 | 3/2017 | De Jager et al. | |
| 2020/0139146 | A1* | 5/2020 | Khakpour | A61C 17/20 |
| 2024/0042173 | A1* | 2/2024 | Schumacher | A61M 5/172 |

OTHER PUBLICATIONS

Tim Kruger, Christian Hegger, Valentin Schreiner, Jurgen Maas. "Mass adaptation for moving parts using a magnetically induced placement of a certain amount of magnetorheological fluid" Proceedings of SPIE 10967, 10967, Active and Passive Smart Structures and Integrated Systems XII, 109671X (Mar. 22, 2019); doi: 10.1117/12.2515492.

Raju Ahamed, Seung-Bok Choi, Md Meftahul Ferdaus. "A state of art on magneto-rheological materials and their potential applications" Journal of Intelligent Material Systems and Structures 2018, vol. 29(10) 2051-2095.

* cited by examiner

METHOD AND SYSTEM FOR MAGNETORHEOLOGICAL CONTROL OF PERSONAL CARE DEVICE ORIFICES

This application is the U.S. National Phase application under 35 U.S.C. § 371 of International Application No. PCT/EP2020/073137, filed on Aug. 19, 2020, which claims the benefit of U.S. Application Ser. No. 62/889,092, filed Aug. 20, 2019. These applications are hereby incorporated by reference herein.

FIELD OF THE INVENTION

The present disclosure is directed generally to methods and systems for magnetorheological control of the diameter of a nozzle.

BACKGROUND

Proper personal hygiene can help improve health and reduce issues with disease, infection and other health issues. For example, proper tooth cleaning helps promote long-term dental health. One facet of proper tooth cleaning is the use of oral irrigators to remove dental plaque to clean gums and teeth. Oral irrigators are especially important in areas where toothbrushes cannot easily access, such as between the teeth and at the gum margin. The cleaning force of the liquid pressure provided by the oral irrigator or other personal care cleaning device can be problematic, as increasing the driving pressure reduces the comfort of the liquid jet. If a user experiences discomfort, they may discontinue use of the product; alternatively, if the liquid pressure is not sufficient, it will not provide adequate cleaning.

Effective cleaning of interproximal spaces consistently using powered devices relies on effective user compliance, as well as on both proper positioning of the device and proper treatment strategy, including the need to focus treatment on some areas relative to others. Proper positioning of the device, for example, is inherently dependent on the user's unique oral geometry.

Currently, proper positioning of the powered device, and proper driving pressure of the liquid, requires manual intervention by the user. This is problematic as it is time-consuming and reduces user compliance and cleaning power of the device.

Accordingly, there is a continued need in the art for oral care methods and devices that automatically adjust for a user's unique geometry, thereby increasing cleaning efficacy and user compliance.

SUMMARY OF THE INVENTION

The present disclosure is directed to inventive methods and systems for magnetorheological control of the diameter of a nozzle, such as a nozzle of an oral care device. Various embodiments and implementations herein are directed to an oral care device configured to measure flexural stress on an oral care device nozzle, and automatically adjust the diameter of the nozzle in response to the measured stress using magnetorheological liquid. The personal care device nozzle includes a nozzle housing defining a central channel through which a stream of liquid and/or air is directed, and a housing orifice at the end of the central channel. The nozzle also includes a magnetorheological liquid housing located over at least a portion of the nozzle housing at the housing orifice, and a tip with an adjustable diameter orifice through which the stream of liquid and/or air exits. The adjustable orifice is adjustable between at least a first diameter and a second diameter. The nozzle also includes one or more magnets configured to control magnetorheological liquid in the magnetorheological liquid housing, to adjust between the different diameters of the adjustable diameter orifice. The nozzle may also include a pressure sensor that measures flexural stress on the nozzle near the tip, which is to inform the adjustment of the orifice.

Generally in one aspect, a nozzle for a personal care device is provided. The nozzle includes: (i) a nozzle housing defining a central channel through which a stream of liquid and/or air is directed, and comprising a housing orifice at the end of the central channel; (ii) a magnetorheological liquid housing located over at least a portion of the nozzle housing at the housing orifice, and comprising a tip with an adjustable diameter orifice through which the stream of liquid and/or air exits, wherein the adjustable orifice is adjustable between at least a first diameter and a second diameter; and (iii) one or more magnets configured to control magnetorheological liquid in the magnetorheological liquid housing to adjust between the at least first diameter and second diameter of the adjustable diameter orifice.

According to an embodiment, the device further includes a sensor configured to measure flexural stress on the nozzle near the tip, wherein the adjustable diameter orifice is adjusted between the at least first diameter and second diameter based on measured flexural stress.

According to an embodiment, the magnetorheological liquid housing is concentric relative to the nozzle housing.

According to an embodiment, the magnetorheological liquid housing is press fit on top of the nozzle housing.

According to an embodiment, the magnetorheological liquid housing is adjustable between three or more diameters of the adjustable diameter orifice.

According to an embodiment, the magnet is a coil magnet.

According to an embodiment, the magnet is positioned between the nozzle housing and the magnetorheological liquid housing.

According to an embodiment, the magnet is embedded within at least a portion of the nozzle housing and/or the magnetorheological liquid housing.

According to an aspect, a method for automatically adjusting a diameter of an adjustable diameter orifice is provided. The method includes: providing a nozzle comprising: (i) a nozzle housing; (ii) a magnetorheological liquid housing located over at least a portion of the nozzle housing and comprising an adjustable diameter orifice, wherein the adjustable orifice is adjustable between at least a first diameter and a second diameter; and (iii) one or more magnets configured to control magnetorheological liquid in the magnetorheological liquid housing; modifying, using the one or more magnets, an electromagnetic field at the magnetorheological liquid housing; and automatically adjusting, in response to the modification in the electromagnetic field, the magnetorheological liquid housing, wherein adjusting the magnetorheological liquid housing adjusts the adjustable orifice between at least a first diameter and a second diameter.

According to an embodiment, the method further includes the step of receiving sensor data from a sensor, wherein the modification of the electromagnetic field is based at least in part on the received sensor data.

As used herein for purposes of the present disclosure, the term "controller" is used generally to describe various apparatus relating to the operation of an oral care apparatus, system, or method. A controller can be implemented in numerous ways (e.g., such as with dedicated hardware) to perform various functions discussed herein. A "processor" is one example of a controller which employs one or more microprocessors that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, application specific integrated circuits (ASICs), and field-programmable gate arrays (FPGAs).

The term "user interface" as used herein refers to an interface between a human user or operator and one or more devices that enables communication between the user and the device(s). Examples of user interfaces that may be employed in various implementations of the present disclosure include, but are not limited to, switches, potentiometers, buttons, dials, sliders, track balls, display screens, various types of graphical user interfaces (GUIs), touch screens, microphones and other types of sensors that may receive some form of human-generated stimulus and generate a signal in response thereto.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

These and other aspects of the invention will be apparent from and elucidated with reference to the embodiment(s) described hereinafter.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION OF EMBODIMENTS

The present disclosure describes various embodiments of a method and device for automatically adjusting the diameter of a personal care device nozzle using a magnetorheological liquid. More generally, Applicant has recognized and appreciated that it would be beneficial to provide a system that automatically adjusts to the unique geometry of a user's mouth, thus improving cleaning efficacy. Accordingly, the methods and systems described or otherwise envisioned herein provide a novel adjustable nozzle for a personal care device. The nozzle includes a nozzle housing with a channel through which a stream of liquid and/or air is directed, and a housing orifice at the end of the channel. The nozzle also includes a magnetorheological liquid housing located over at least a portion of the nozzle housing at the housing orifice, and a tip with an adjustable diameter orifice through which the stream of liquid and/or air exits. The nozzle also includes one or more magnets configured to control magnetorheological liquid in the magnetorheological liquid housing, that adjusts between the different diameters of the adjustable diameter orifice. The nozzle may also include a pressure sensor that measures flexural stress on the nozzle near the tip, which is to inform the adjustment of the orifice.

The embodiments and implementations disclosed or otherwise envisioned herein can be utilized with any personal care device, including but not limited to a toothbrush, a flossing device, an oral irrigator, and many other oral devices. For example, one application of the embodiments and implementations herein is to improve oral cleaning efficacy using an oral care device such as, e.g., a flossing device such as a Philips AirFloss® (manufactured by Koninklijke Philips Electronics, N.V.). However, the disclosure is not limited to a flosser and thus the disclosure and embodiments disclosed herein can encompass any personal care device.

Figure 1:
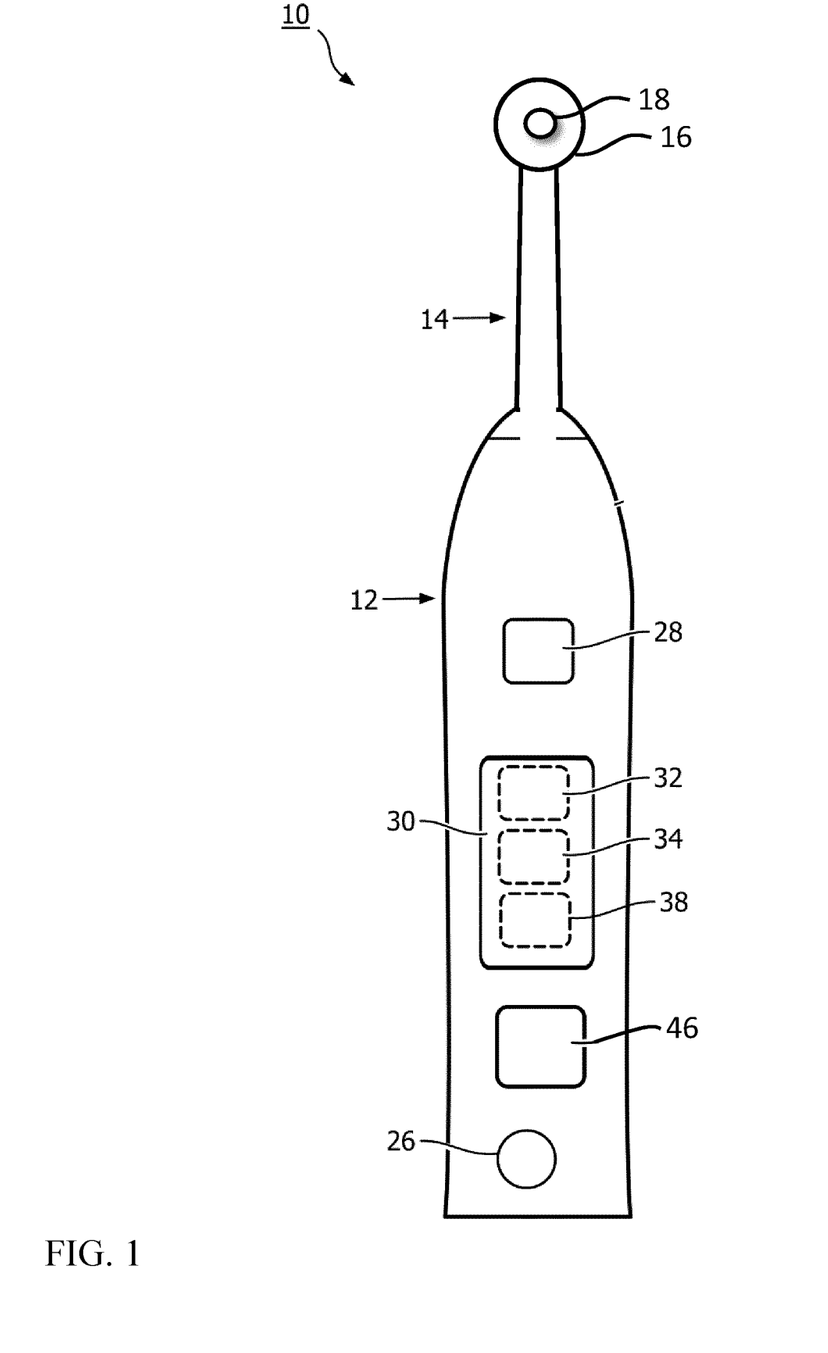
FIG. 1 is a schematic representation of a personal care device, in accordance with an embodiment.

Referring to FIG. 1, in one embodiment, is an oral care device 10 with a body portion 12 and a nozzle member 14 mounted on the body portion. Nozzle member 14 includes at its end remote from the body portion a nozzle 16 with a guidance tip 18. The nozzle 16 comprises an orifice configured to emit liquid and/or air from the device, and may optionally include a guidance tip 18 configured to enable the user to properly position the device. According to an embodiment, nozzle member 14, nozzle 16, and/or guidance tip 18 are configured to allow the passage of pressurized liquid and/or air from a reservoir in the body 12 (not shown) to the nozzle head where it is applied to the user's mouth geometry. Nozzle member 14 can be detachably mounted onto body portion 12 such that the nozzle can periodically be replaced with a new one when a component of the device is worn out or otherwise requires replacement. Although the adjustable nozzle system is described herein in reference to an oral care device, it is understood that the adjustable nozzle may be applied to a variety of personal care device as described or otherwise envisioned herein.

Body portion 12 can be further provided with a user input 26. The user input 26 allows a user to operate the oral care device 10, for example to turn the oral care device on and off. The user input 26 may, for example, be a button, touch screen, or switch. Oral cleaning device 10 optionally includes one or more sensors 28. Sensor 28 is shown in FIG. 1 within body portion 12, but may be located anywhere within the device. Sensor 28 can comprise, for example, a 6-axis or a 9-axis spatial sensor system, and can include one or more of an accelerometer, a gyroscope, and/or a magnetometer to provide readings relative to axes of motion of the oral cleaning device, and to characterize the orientation and displacement of the device. For example, the sensor 28 can be configured to provide readings of six axes of relative motion (three axes translation and three axes rotation), using for example a 3-axis gyroscope and a 3-axis accelerometer.

Many other configurations are possible. According to an embodiment, oral care device 10 further includes a user interface 46 configured to provide information to a user before, during, and/or after a care session. The user interface 46 can take many different forms, but is configured to provide information to a user.

Personal care device 10 further comprises a controller 30 configured to control and/or monitor one or more functions of the device. Controller 30 may be formed of one or multiple modules, and is configured to operate the oral cleaning device 10 in response to an input, such as input obtained via user input 26. Controller 30 can comprise, for example, at least a processor 32, a memory 34, and a connectivity module 38. The processor 32 may take any suitable form, including but not limited to a microcontroller, multiple microcontrollers, circuitry, a single processor, or plural processors. The memory 34 can take any suitable form, including a non-volatile memory and/or RAM. The non-volatile memory may include read only memory (ROM), a hard disk drive (HDD), or a solid state drive (SSD). The memory can store, among other things, an operating system. The RAM is used by the processor for the temporary storage of data. According to an embodiment, an operating system may contain code which, when executed by controller 30, controls operation of the hardware components of oral cleaning device 10. According to an embodiment, connectivity module 38 transmits collected sensor data, and can be any module, device, or means capable of transmitting a wired or wireless signal, including but not limited to a Wi-Fi, Bluetooth, near field communication, and/or cellular module.

Figure 2:
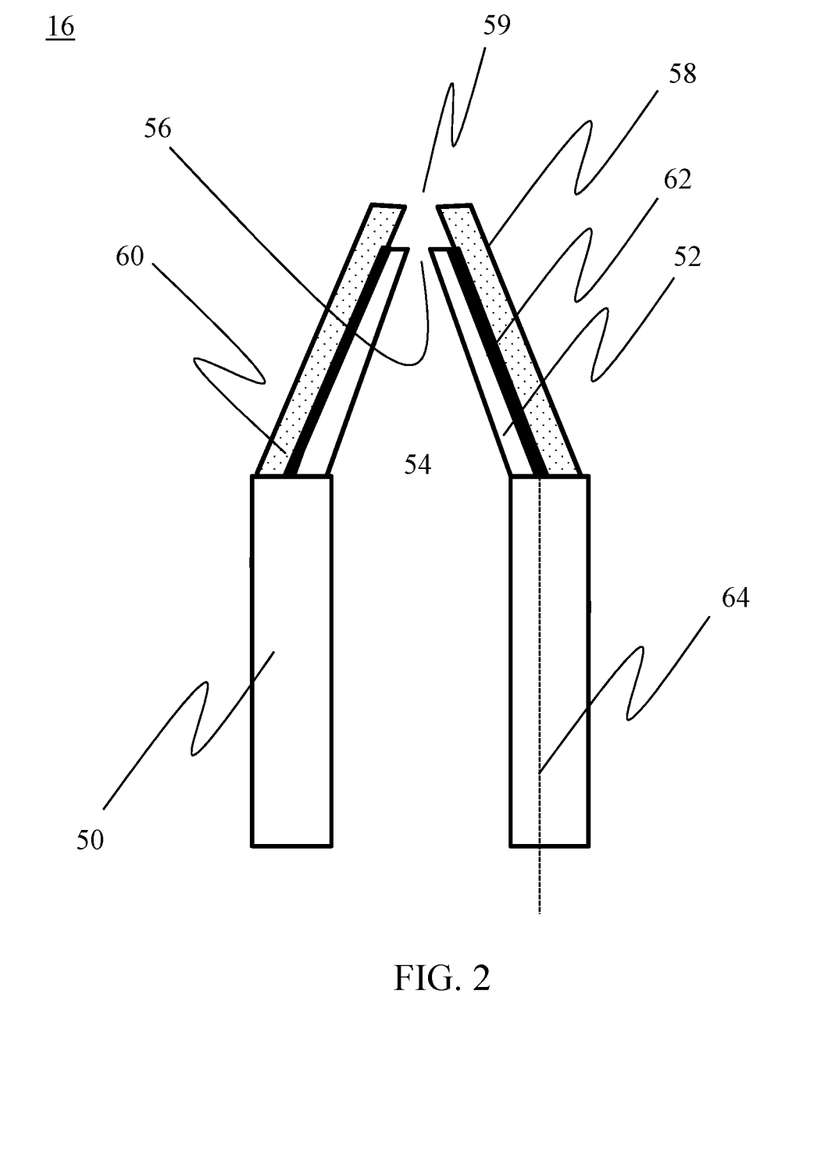
FIG. 2 is a schematic representation of a nozzle of a personal care device, in accordance with an embodiment.

Referring to FIG. 2, in one embodiment, is a side cutaway view of a nozzle head 14 of an oral care device. The nozzle head includes a nozzle housing with a nozzle base 50 and a nozzle cover 52, where the nozzle base and nozzle cover may be separate or a single component(s). In many embodiments, the nozzle head 50 and/or nozzle cover 52 are circular and/or curved, such as to better fit within the geometry of the user's mouth when the personal care device is an oral care device. In other embodiments, the nozzle head 50 and/or nozzle cover 52 may be square, rectangular, or any other shape suitable to the intended use.

The nozzle housing comprises or defines a central channel 54 through which a stream of liquid and/or air is directed. The stream of liquid and/or air, which may be used for example for cleaning or flossing or other applications, originates from a reservoir within the personal care device. The liquid travels from the reservoir through the central channel 54 and out a housing orifice 56 at high pressure to produce a stream that can perform the intended function. The housing orifice 56 comprises a fixed first diameter, which is determined by the manufacturing and/or design parameters of the device.

The nozzle head further comprises a concentric magnetorheological liquid housing 58 located over at least a portion of the nozzle housing at the housing orifice. For example, as shown in FIG. 2, the magnetorheological liquid housing 58 covers the entire nozzle housing 52, as a concentric circular component. The magnetorheological liquid housing 58 can be, for example, press fit on top of the assembled nozzle.

The magnetorheological liquid housing 58 includes an adjustable diameter orifice 59 through which the stream of liquid and/or air is expelled. This expelled stream of liquid and/or air may be used for example for cleaning or flossing or other applications. The stream originates from a reservoir within the personal care device, travels from the reservoir through the central channel 54 and out via housing orifice 56 and adjustable diameter orifice 59 at high pressure to produce a stream that can perform the intended function. The adjustable diameter orifice 59 comprises an adjustable diameter that is reversibly convertible between at least a first diameter and a second, different diameter (where the second diameter is smaller or larger than the first diameter). The diameter of the adjustable diameter orifice 59 is determined by the magnetorheological liquid housing 58 as described or otherwise envisioned herein.

According to an embodiment, the magnetorheological liquid housing 58 comprises or defines an internal chamber comprising a magnetorheological liquid 60. A magnetorheological liquid exhibits adjustable rheological properties that quickly change upon application of a magnetic field. A magnetorheological liquid comprises small particles, such as micron-sized (e.g., 3-5 μm) ferrous or iron particles, that are dispersed in a carrier medium such as fluid, gel, elastomer, or other medium.

In the presence of an external magnet field, such as that introduced by an electromagnet in proximity to the liquid, a magnetorheological liquid can form a chain-like or semi-solid state in just a few milliseconds. Upon removal of the magnetic field, such as when the electromagnet is inactivated, a magnetorheological liquid in a chain-like or semi-solid state will revert to its more fluid, free-flowing, less organized state in just a few milliseconds. By controlling the strength of the electromagnetic field, the electromagnet (and its controller) can control the yield strength or semi-solid state of the magnetorheological liquid. Thus, the magnetorheological liquid can possibly adopt more than two different states.

When the magnetorheological liquid is placed within a housing such as the magnetorheological liquid housing 58, the rheological change of the liquid can affect the housing. If the housing is moveable or adjustable, switching from a liquid state to a semi-solid state can move or adjust the housing. For example, a housing with an orifice or other gap may comprise an open orifice or gap when the magnetorheological liquid is in a liquid or free-flowing state, but may close the orifice or gap when the magnetorheological liquid is in a semi-solid state by using the yield strength of the semi-solid structure to affect and move/adjust the housing structure.

Accordingly, the magnetorheological liquid 60 can be any magnetorheological liquid suitable for adjusting the magnetorheological liquid housing 58 of the device in a desirable way, including by not limited to the magnetorheological liquids described or otherwise envisioned herein. As just one example, switching the magnetorheological liquid from at least a partially free-flowing state to at least a partially semi-solid state may cause movement of the adjustable diameter orifice 59 to at least partially reduce or close the diameter of orifice 59. Many other adjustments using the magnetorheological liquid and magnetorheological liquid housing are possible.

According to an embodiment, the nozzle head and/or magnetorheological liquid housing 58 comprises an electromagnet component 62 located in proximity to the magnetorheological liquid 60 in the magnetorheological liquid housing 58, which controls the structure of the magnetorheological liquid. For example, the electromagnet component 62 can be controlled (including activated, deactivated, and weakened or strengthened) via the controller of the device by controlling the power directed to the electromagnet component 62. Thus, the electromagnet component 62 may be connected to a power source and/or the controller via a. For example, the lead of the electromagnet component 62 may be connected via docking/connecting of the nozzle to a handle connector assembly. The electromagnet component 62 may be a coil magnet that coils around or near at least a portion of the magnetorheological liquid housing to affect the magnetorheological liquid. For example, the electromagnet component 62 may be located between the nozzle housing and the magnetorheological liquid housing, and/or may be embedded within the nozzle housing and/or the magnetorheological liquid housing.

The magnetorheological liquid may be converted to a semi-solid state, thus adjusting the structure, orientation, or other physical parameter of the magnetorheological liquid housing, by applying an electrical current that the electromagnet component 62 receives from the device via the power lead 64. Similarly, the magnetorheological liquid may be further directed to an even more solid semi-solid state by an increase of current to the electromagnet component 62, or to a less solid semi-solid state by a decrease of current to the electromagnet component 62. The magnetorheological liquid may be directed to a free-flowing state by removing application of a current to the electromagnet component 62. Any of these changes may adjust the structure, orientation, or other physical parameter of the magnetorheological liquid housing.

Figure 3:
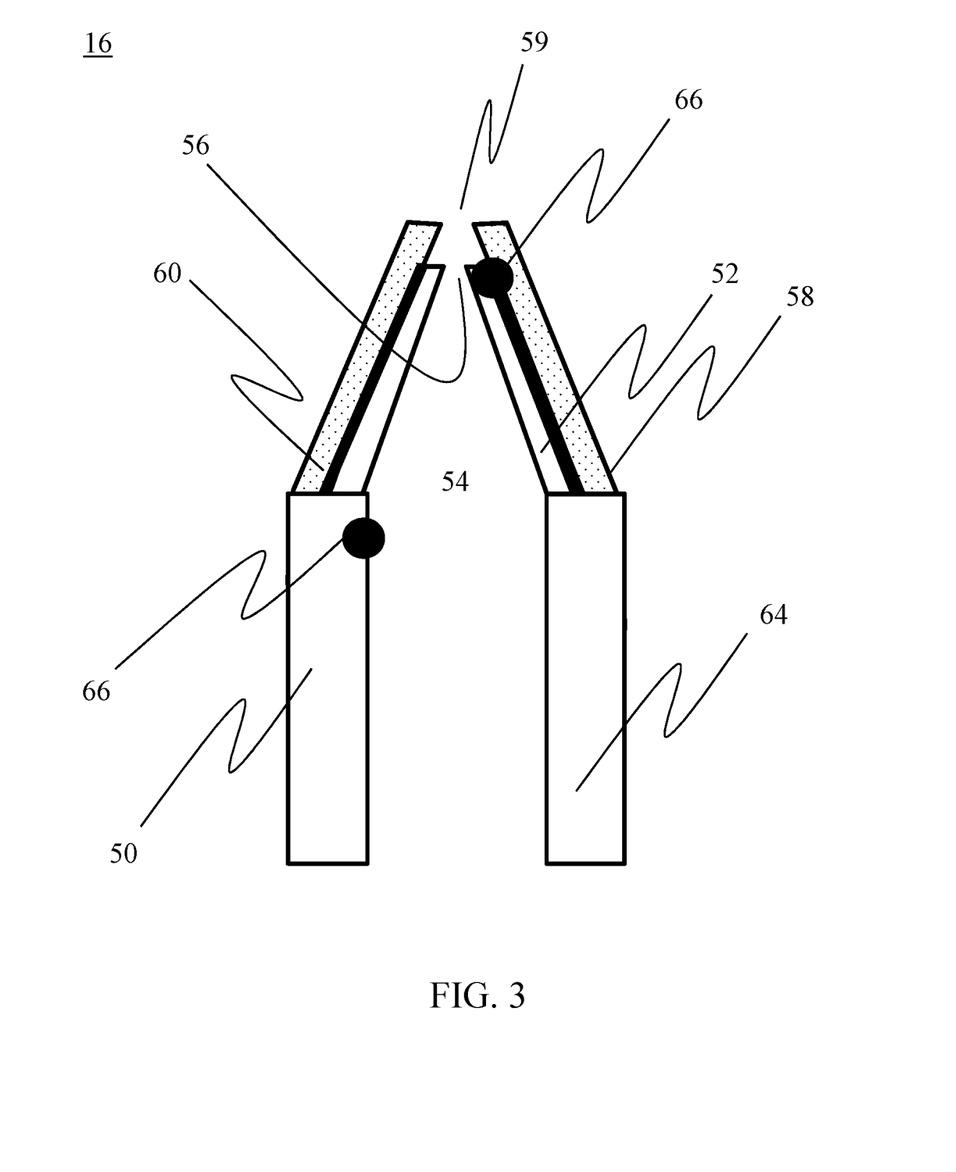
FIG. 3 is a schematic representation of a nozzle of a personal care device, in accordance with an embodiment.

Referring to FIG. 3, in one embodiment, is a side cutaway view of a nozzle head 14 of an oral care device. The nozzle head includes a nozzle housing with a nozzle base 50 and a nozzle cover 52, a central channel 54 and a housing orifice 56 through which a stream of liquid and/or air is directed, a magnetorheological liquid housing 58 located over at least a portion of the nozzle housing at the housing orifice, including an adjustable diameter orifice 59 and a magnetorheological liquid 60.

According to an embodiment, nozzle head 14 comprises one or more sensors 66 that enable a feedback loop for the adjustment of the adjustable diameter orifice 59 to better conform to the space being treated by the personal care device. For example, the signal that can be used to enable the feedback loop is the flexural stress on the nozzle. Sensor 66 can, therefore, measure the flexural stress on the nozzle, and can transmit that information to the device, such as to the controller, to determine whether adjust the adjustable diameter orifice 59. Another option is to measure the resistance to the stream exiting the device for feedback information. For example, the device programming or settings may be programmed, determined, or otherwise set such that the adjustable diameter orifice 59 should widen if there is little or less flexural stress on the nozzle (indicating that more pressure from the liquid, produced by narrowing the adjustable diameter orifice 59, is desirable). As another example, the device programming or settings may be programmed, determined, or otherwise set such that the adjustable diameter orifice 59 should narrow if there is high or more flexural stress on the nozzle (indicating that les pressure from the liquid, produced by widening the adjustable diameter orifice 59, is desirable).

According to an embodiment, the sensor 66 may be any sensor suitable to measure the desired parameter to lead to adjustment of the adjustable diameter orifice 59. For example, the sensor 66 may be a micro-strain gage (such as a rosette type) embedded within or otherwise on or in conjunction with the nozzle tip. Many other types of sensors are possible. According to another embodiment, the sensor measures spatial variation in the supply electromagnetic field as a feedback signal to adjust the nozzle diameter.

Figure 4A:
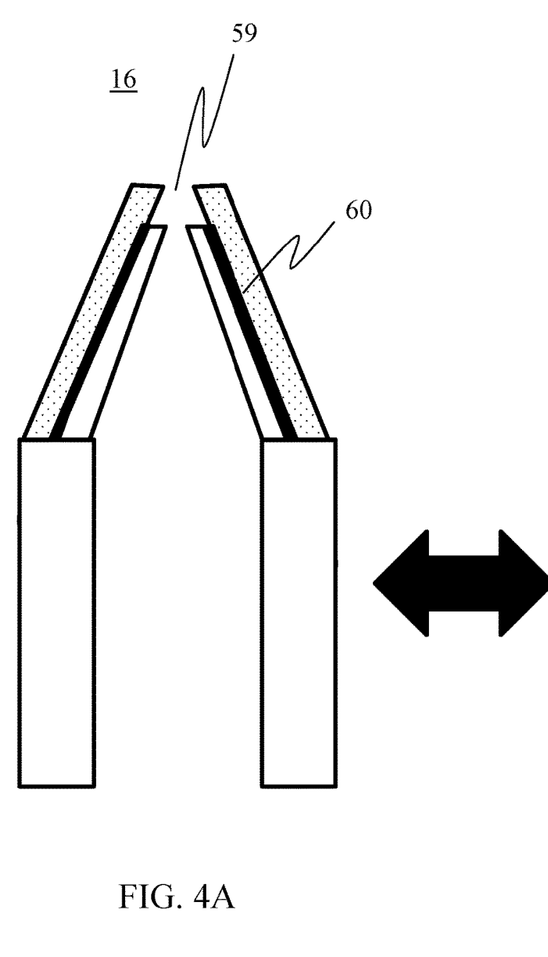
FIG. 4A is a schematic representation of a nozzle of a personal care device in a first configuration, in accordance with an embodiment.
Figure 4B:
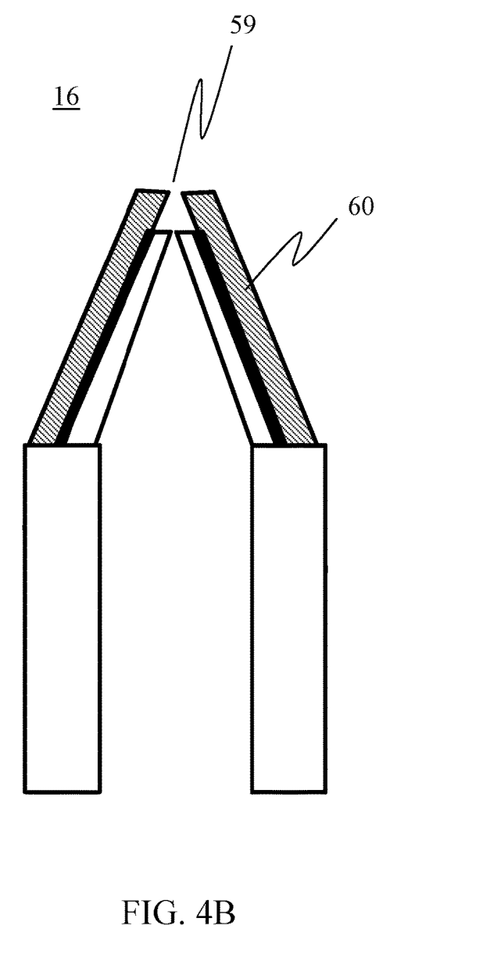
FIG. 4B is a schematic representation of a nozzle of a personal care device in a second configuration, in accordance with an embodiment.

Referring to FIGS. 4A and 4B, in one embodiment, are a nozzle head 16 in a first configuration (FIG. 4A) and a second configuration (FIG. 4B). In the first configuration in FIG. 4A, the magnetorheological liquid 60 is in more of a free-flowing state, potentially because no current is being applied to the electromagnet and there is no or little electromagnetic field. Thus, the adjustable diameter orifice 59 comprises a first, more open diameter.

In the second configuration in FIG. 4B, the magnetorheological liquid 60 is in more of a semi-solid state, because a current is being applied to the electromagnet and there is an applied electromagnetic field. Thus, the adjustable diameter orifice 59 comprises a second, more closed diameter. The device is reversibly adjustable between the first and second diameter (and possibly other diameters) by controlling the electromagnetic field.

Accordingly, the magnetorheological effect enables use of a smart fluid which allows the variation of material properties of particulate-laden fluids. For example, the use of an applied magnetic field to allow preferential alignment of magnetic dipoles along the direction of the field. This in turn is effectively a variation in apparent viscosity of the fluid, causing a liquid to solid transition. The device therefore enables adjustment of the strength of the magnetic field to meet the high-level orifice open/close specifications of the nozzle. According to an embodiment, the magnetic field can be from 0 to about 2500 Gauss to enable adjustment, although many other amounts or ranges are possible.

According to an embodiment, the personal care device described or otherwise envisioned herein has numerous benefits and applications. For example, the adjustable device enables and new and customized rapid flow modes, customized mouth pieces with a magnetorheological elastomer designed to conform to the user's in-mouth geometry, a flow angulation feature to the millimeter to centimeter range, a sensing mechanism for user guidance and potentially systemic health (such as blood/iron content detection), and many more.

Figure 5:
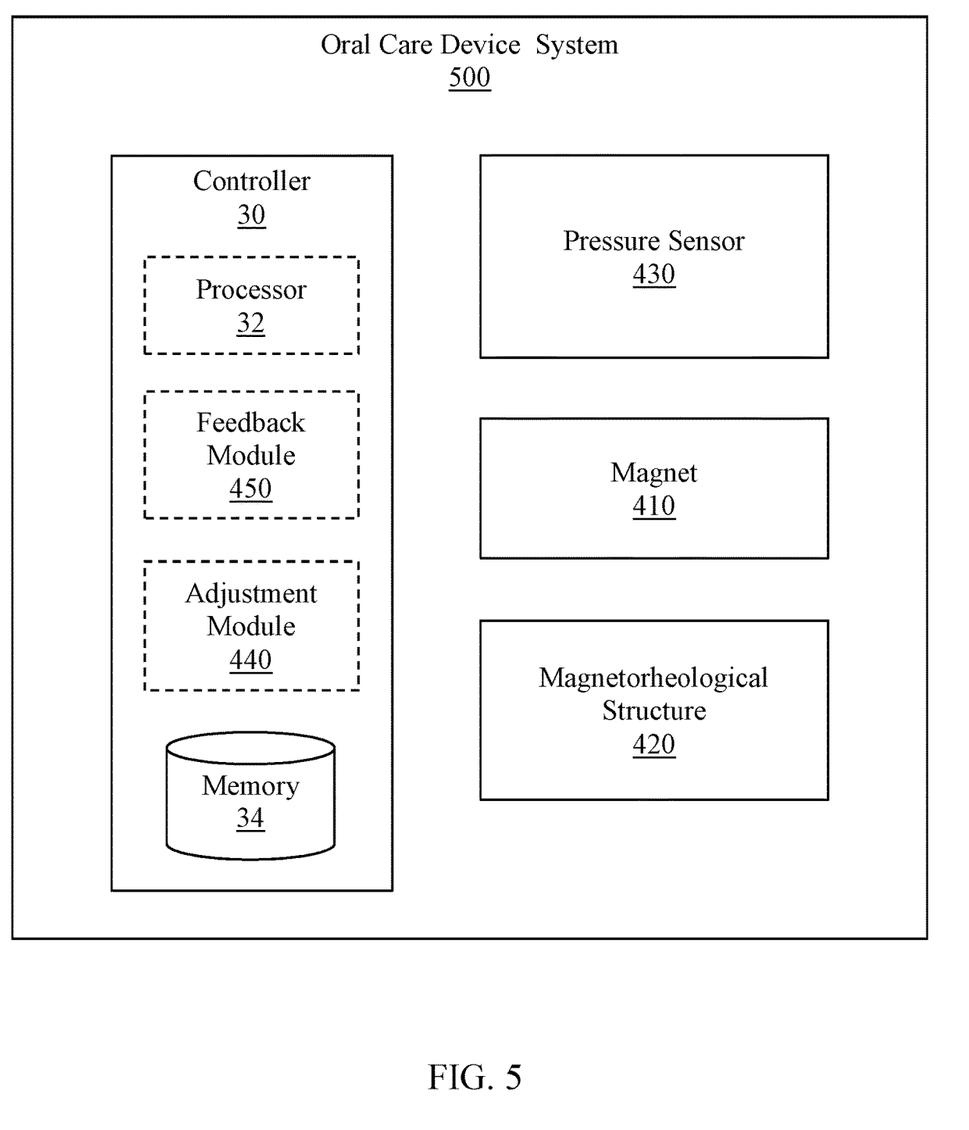
FIG. 5 is a schematic representation of a personal care system, in accordance with an embodiment.

Referring to FIG. 5, in one embodiment, is a personal care device system 500. According to an embodiment, the personal care device system includes a controller 30 comprising a processor 32 and a memory 34. The personal care device system also comprises a magnet 410, a magnetorheological structure 420, and optionally includes a sensor 430.

Controller 30 of the system optionally includes a feedback module 450 and an adjustment module 440. The adjustment module 440 receives information and/or instructions from the controller, user, and/or other source to check and/or adjust the diameter of the adjustable diameter orifice. For example, the adjustment module 440 may receive or generate instructions to cause the associated magnet 410 near the magnetorheological housing to activate, to produce a magnet field of a certain strength, or to deactivate. The adjustment module 440 is designed or programmed such that a specific magnetic field strength is applied to result in a specific diameter of the magnetorheological structure 420 which according to an embodiment is the adjustable diameter orifice.

The feedback module 450 receives information from one or more sensors to generate feedback information for the nozzle. This sensor information is utilized to determine flexural stress on the nozzle of the device, and/or other information applicable to the strength of flow of liquid and/or air from the nozzle of the device. The information is translated into the need to narrow or widen the diameter of the adjustable diameter orifice to produce a certain flow, and can be communicated to the adjustment module 440 which can adjust the diameter.

According to an embodiment, personal care device system 500 can be implemented as a flosser or similar device, as shown in FIG. 1. According to another embodiment, personal care device system 500 can be implemented as any device configured to come into proximity with tissues for cleaning where an adjustable diameter orifice may be desirable. For example, personal care device system 500 can be implemented an oral care device such as a toothbrush, an oral irrigator, a tongue cleaner, or any other oral care device.

Figure 6:
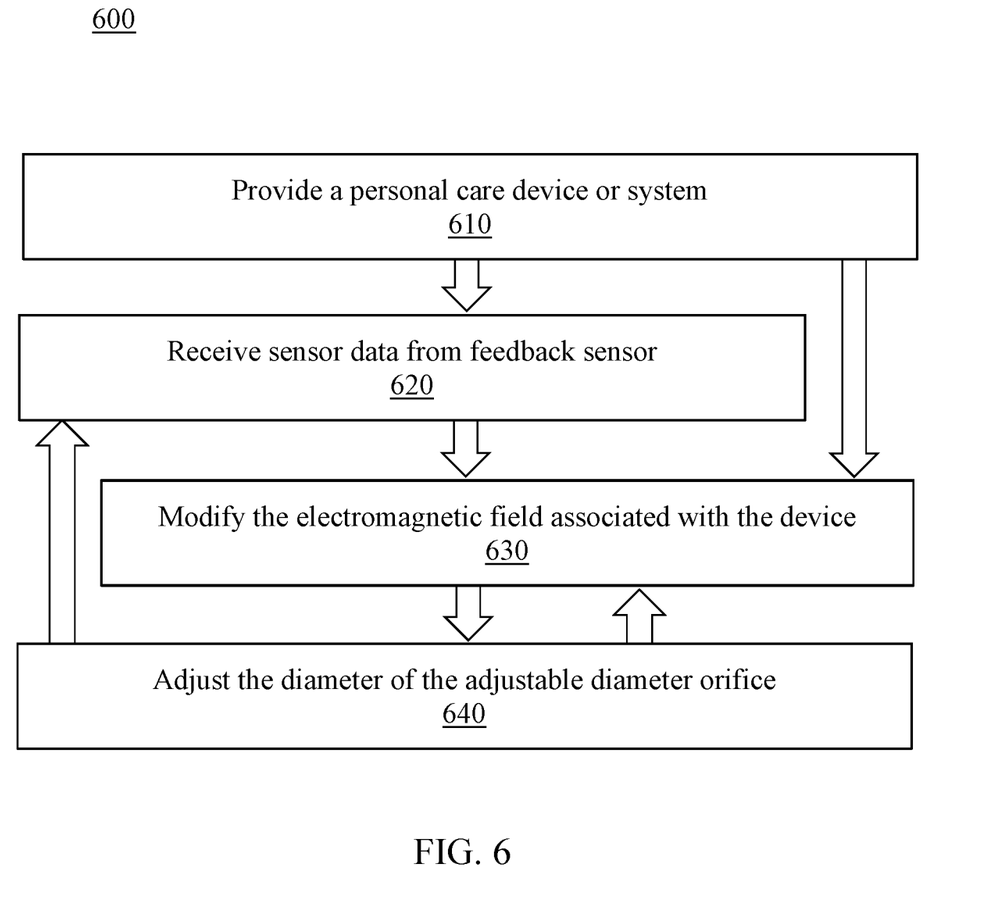
FIG. 6 is a flowchart of a method for automatically adjusting the diameter of a nozzle, in accordance with an embodiment.

Referring to FIG. 6, in one embodiment, is a flowchart of a method 600 for adjusting the diameter of an adjustable diameter orifice. In step 610, a personal care device or system is provided. The personal care device or system can be any of the devices or systems described or otherwise envisioned herein. For example, the personal care device system may be oral care device 10 or personal care device system 500, among many other devices or systems. Generally, the personal care device or system will comprise a nozzle head with a nozzle housing 50/52, a central channel 54 and a housing orifice 56 through which a stream of liquid and/or air is directed, a magnetorheological liquid housing 58 located over at least a portion of the nozzle housing at the housing orifice, including an adjustable diameter orifice 59 and a magnetorheological liquid 60. The personal care device or system will also include a controller 30 and a magnet 62. Many other components are possible, including but not limited to a sensor 66 and other components. Although method 600 is described within the framework of an oral care device 10, the method can be implemented using any other personal care device.

At optional step 620 of the method, the system receives data from the feedback sensor. This data may be measured flexural stress on the device, liquid flow resistance, and/or any of a variety of other measurements. The data may be communicated or otherwise received by the controller or other component of the device.

At step 630 of the method, the system modifies the electromagnetic field of the magnet associated with the magnetorheological liquid. Modification of the electromagnetic field may include, for example, activating an electromagnetic field, modifying the strength of the electromagnetic field, and/or deactivating the electromagnetic field. According to an embodiment, modifying the electromagnetic field of the magnet associated with the magnetorheological liquid comprises adjusting the amount of electricity provided to the electromagnet. The system may determine the need to adjust the electromagnetic field of the magnet based on received sensor data, position data, feedback data, and/or any other data. The need to modify the electromagnetic field of the magnet is correlated with the need or goal to adjust the diameter of the adjustable diameter orifice.

At step 640 of the method, the diameter of the adjustable diameter orifice is modified in response to the modification of the electromagnetic field. With the activation of an electromagnetic field, the magnetorheological liquid within the magnetorheological liquid housing is transformed from a largely free-flowing state to a highly-organized semi-solid state, which changes the configuration of the adjustable diameter orifice. With an increase in the strength of the electromagnetic field, the magnetorheological liquid within the magnetorheological liquid housing is further organized into a more solid semi-solid state, thereby further changing the configuration of the adjustable diameter orifice, typically by reducing the diameter of the orifice. With a decrease in the strength of the electromagnetic field, the magnetorheological liquid within the magnetorheological liquid housing is more free-flowing, thereby further changing the configuration of the adjustable diameter orifice, typically by opening or widening the diameter of the orifice. Similarly, with inactivation or removal of the electromagnetic field, the magnetorheological liquid within the magnetorheological liquid housing reverts to its most free-flowing state, thereby further changing the configuration of the adjustable diameter orifice, typically by opening or widening the diameter of the orifice.

According to an embodiment, the brush head of a toothbrush may comprise one or more magnetorheological liquid housings with magnetorheological liquid, which may be utilized during operation of the toothbrush. For example, the motion of the brush head may be used to generate an induced electromotive field using the magnetorheological liquid, which can then be fed back to the drive train electronics. This could be used, for example, to modulate the drive train signal to adjust motion of the brush head.

According to another embodiment, a magnetorheological liquid may be utilized as a load (pressure) sensor. As the force on the brush head increases by the user's actions, the induced electromotive field changes. The change in the electromotive field is detected by the brush, and since that change is coupled to a change in pressure, the brush can detect these pressure changes.

According to another embodiment, magnetorheological liquid and/or particles can be embedded in the neck of the brush head and/or within the brush head itself. Applying a magnetic field to the magnetorheological component in the neck and/or head using electromagnets as described or otherwise envisioned herein, additional or alternative motion may be induced. For example, application of the magnetic field may change the shape of the neck and/or brush head to result in geometry that better suits the user's mouth, or that better cleans the user's mouth.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

What is claimed is:

1. A nozzle for use with a personal care device, comprising:
    a nozzle housing defining a central channel through which a stream of liquid and/or air is directed, and comprising a housing orifice at the end of the central channel;
    a magnetorheological liquid housing located over at least a portion of the nozzle housing at the housing orifice, and comprising a tip with an adjustable diameter orifice through which the stream of liquid and/or air exits, wherein the adjustable orifice is adjustable between at least a first diameter and a second diameter; and
    one or more magnets configured to control magnetorheological liquid in the magnetorheological liquid housing to adjust between the at least first diameter and second diameter of the adjustable diameter orifice.

2. The nozzle of claim 1, further comprising:
    a sensor configured to measure flexural stress on the nozzle near the tip, wherein the adjustable diameter orifice is adjusted between the at least first diameter and second diameter based on measured flexural stress.

3. The nozzle of claim 1, wherein the magnetorheological liquid housing is concentric relative to the nozzle housing.

4. The nozzle of claim 1, wherein the magnetorheological liquid housing is press fit on top of the nozzle housing.

5. The nozzle of claim 1, wherein the magnetorheological liquid housing is adjustable between three or more diameters of the adjustable diameter orifice.

6. The nozzle of claim 1, wherein the magnet is a coil magnet.

7. The nozzle of claim 1, wherein the magnet is positioned between the nozzle housing and the magnetorheological liquid housing.

8. The nozzle of claim 1, wherein the magnet is embedded within at least a portion of the nozzle housing and/or the magnetorheological liquid housing.

9. A method for automatically adjusting a diameter of an adjustable diameter orifice, comprising:
    providing a nozzle comprising: (i) a nozzle housing; (ii) a magnetorheological liquid housing located over at least a portion of the nozzle housing and comprising an adjustable diameter orifice, wherein the adjustable orifice is adjustable between at least a first diameter and a second diameter; and (iii) one or more magnets configured to control magnetorheological liquid in the magnetorheological liquid housing;
    modifying, using the one or more magnets, an electromagnetic field at the magnetorheological liquid housing; and
    automatically adjusting, in response to the modification in the electromagnetic field, the magnetorheological liquid housing, wherein adjusting the magnetorheological liquid housing adjusts the adjustable orifice between at least a first diameter and a second diameter.

10. The method of claim 9, further comprising the step of receiving sensor data from a sensor, wherein the modification of the electromagnetic field is based at least in part on the received sensor data.

11. The method of claim 10, wherein the sensor is configured to measure flexural stress on the nozzle near the tip.

12. The method of claim 9, wherein the magnetorheological liquid housing is concentric relative to the nozzle housing.

13. The method of claim 9, wherein the magnetorheological liquid housing is adjustable between three or more diameters of the adjustable diameter orifice.

14. The method of claim 9, wherein the magnet is a coil magnet.

15. The method of claim 9, wherein the magnet is positioned between the nozzle housing and the magnetorheological liquid housing.

* * * * *